United States Patent [19]

Fickelscher

[11] Patent Number: 4,541,816
[45] Date of Patent: Sep. 17, 1985

[54] SHAFT-COUPLING

[75] Inventor: Kurt G. Fickelscher, Frankenthal, Fed. Rep. of Germany

[73] Assignee: Balcke-Duerr AG, Ratingen, Fed. Rep. of Germany

[21] Appl. No.: 574,579

[22] Filed: Jan. 27, 1984

[30] Foreign Application Priority Data

Feb. 12, 1983 [DE] Fed. Rep. of Germany ....... 3304888

[51] Int. Cl.[4] .............................................. F16D 3/50
[52] U.S. Cl. ..................... 464/81; 464/158; 464/51
[58] Field of Search ............... 464/158, 73, 27, 24, 464/63, 64, 74, 51; 74/461, 411

[56] References Cited

U.S. PATENT DOCUMENTS

| 1,784,396 | 12/1930 | Still | 464/63 |
| 2,446,942 | 8/1948 | McFarland | 464/74 |
| 3,055,195 | 9/1962 | Olson | 464/51 |
| 4,047,395 | 9/1977 | Bendall | 464/51 |
| 4,373,925 | 2/1983 | Fickelscher | 464/158 |

FOREIGN PATENT DOCUMENTS

| 611897 | 4/1935 | Fed. Rep. of Germany ........ 464/27 |
| 2742442 | 7/1979 | Fed. Rep. of Germany . |
| 2924935 | 1/1981 | Fed. Rep. of Germany . |
| 3036570 | 4/1982 | Fed. Rep. of Germany . |
| 2053415 | 2/1981 | United Kingdom . |

Primary Examiner—Stephen Marcus
Assistant Examiner—Leo J. Peters
Attorney, Agent, or Firm—Schwartz, Jeffery, Schwaab, Mack, Blumenthal & Evans

[57] ABSTRACT

A shaft-coupling having two halves, each formed with at least two flat, sloping surfaces running at right angles to a load-transfer direction, each pair of sloping surfaces, facing each other on the two halves of the coupling, defining a space therebetween. Arranged in these spaces are sliding wedges each comprising two flat, sliding, surfaces facing away from each other and supported upon a pressure-element. In order to ensure that a shaft-coupling of this kind be suitable for large torsion-angles, absorb high torques and, in addition, has a small structural volume, a spring-element, adapted for the radial spring-action, is provided between at least one sliding wedge and the pressure-element.

8 Claims, 8 Drawing Figures

SHAFT-COUPLING

The invention relates to a shaft-coupling consisting of two halves each carrying at least two flat, sloping surfaces running at right angles to the load-transfer direction, each pair of sloping surfaces, facing each other on the two halves of the coupling defining a space, with sliding wedges arranged in the spaces and each carrying two flat, sliding surfaces, facing away from each other, and with a pressure-element upon which the said sliding wedges are supported.

U.S. Pat. No. 4,373,925 describes a resilient shaft-coupling, the halves of which are in the form of central gears of the same type. The said central gears have teeth which have flat sloping surfaces arranged in pairs and defining gaps opening in the radial direction. Engaging in these gaps are the wedge-shaped teeth of a planetary gear comprising an annular pressure-element. When pressure is applied to this resilient shaft-coupling, the two halves thereof rotate in relation to each other, thus narrowing the said gaps. The coupling being designed as a dog-coupling, the said gaps are between the dogs which comprise the said sloping surfaces. The resilient pressure-element provides for resilient spring-action upon the sliding wedges. The sliding wedges and the pressure-element comprise outer surfaces associated with each other and with matching geometry so that, when a load is applied to the coupling, the pressure-element adapts itself, to a greater or lesser degree, to the outer surfaces of the sliding wedges. The resiliency of the shaft-coupling is predetermined by the design of the pressure-element. In the case of couplings designed for high torques, difficulties arise in that the said pressure-element must have the desired resiliency and the desired load-carrying capacity, which means meeting conflicting requirements. The higher the torque to be transferred, the larger the required total surface of the coupling-halves engaged with each other, and of the sliding wedges, in order to avoid exceeding the permissible surface-pressure; in principle, therefore, the number of sliding wedges, and the number of deformation-locations of the pressure-element, must be increased. For a given structural volume, however, this considerably reduces the resiliency of the shaft-coupling and the torsion-angle. Furthermore, relatively close tolerances must be maintained, if the pressure-element is to exhibit the necessary resiliency. Moreover, the vibrational behaviour and damping characteristics of these known shaft-couplings were found to be dependent to a certain degree upon temperature.

It is therefore an object of the invention to provide a shaft-coupling of this type, at low structural cost, in such a manner as to achieve the desired resiliency with low production costs. This shaft coupling provides a relatively large torsion-angle, more particularly between 4 and 5 degrees, is highly resilient, has a very reduced structural volume and a small mass. Furthermore, the said shaft-coupling has a very reduced unbalanced mass and is suitable for high rotation speeds. The small structural volume and high resiliency are of great importance if the coupling is to be used in heavy machinery for the transfer of high torques—high torques, in this connection, meaning torques in excess of one million Newton-meters. The shaft coupling is intended to be used mainly in heavy machinery for transferring high torques. The said coupling is also to be reliable in operation and to meet operational requirements. In addition to this, the said shaft-coupling is to be easily adaptable to given requirements, in other words the spring-action, and thus the resiliency, is to be predeterminable in a specific manner.

According to the invention, this object is accomplished generally by providing a spring-element between at least one sliding wedge and the pressure-element, for the radial spring-action.

The shaft-coupling is noted for its simple construction, the resiliency thereof being reliably and specifically predetermined by the spring-element. This resiliency is largely independent of external factors, such as production tolerances, temperature, and the like. The construction according to the invention makes it surprisingly simple to achieve a considerable reduction in the number of sliding wedges and deformation-locations, as compared with known shaft-couplings. It should be pointed out at this time that radial spring-force increases disproportionately as the number of deformation-locations increases. For instance a factor for the radial force in the case of three deformation-locations is 30, whereas in the case of two deformation-locations, the factor is of the order of 5. The spring-element according to the invention, arranged between the sliding wedges and the pressure-element, makes it surprisingly easy to keep the number of deformation-locations small since, on the one hand, the necessary radial force is applied by the spring-element and, on the other hand, a surprisingly large torsion-angle is obtained, even with high torques. According to the invention, therefore, it is possible to achieve a considerable reduction in structural volume at an extremely low cost. As compared with shaft-couplings of similar structural volume, the shaft-coupling according to the invention is substantially more resilient, which permits a considerably larger torsion-angle between the machine-parts to be coupled together. For instance, this makes it possible for a shaft-coupling according to the invention, in a transmission coupled to a motor, to be made substantially smaller, since starting-shocks or other peak loads are absorbed by the shaft-coupling. According to the invention, the pressure-element is rigid, and the dimensioning thereof therefore requires no compromises in respect of resiliency. Also within the scope of the invention, at least one surface, be it a sliding surface or a sloping surface, is arranged pivotably in each gap, in order to achieve the adaptation necessary in the event of a load-change.

In a particular embodiment, each sliding wedge is supported, by means of a spring-element, upon the pressure-element which is arranged radially inwardly and is substantially rigid. A symmetrical arrangement is assured and the spring-elements centre the pressure-element, thus reliably eliminating unbalanced masses. As a result of the internal arrangement of the pressure-element, the sliding wedges are urged radially outwardly, by centrifugal force, onto the sloping surfaces of the halves of the coupling. In a particularly advantageous manner, centrifugal force assists the force applied by the spring-element, which can therefore be made correspondingly smaller; this again reduces the structural volume.

In another particular construction, the pressure-element comprises at least one chamber in which the spring-element is arranged. In a particularly advantageous manner, the said spring-element may thus be incorporated into the said pressure-element, into the chamber thereof. This also permits, without any difficulty, long spring-travels and/or high spring-forces. This again reduces structural volume and, in particular, the diameter of the shaft-coupling.

According to another embodiment of the invention, at least one and preferably two of the sloping surfaces and/or sliding surfaces are arranged in each gap containing a sliding wedge. This ensures the adaptation, known per se, required in the event of load variation and, in conjunction with the support according to the invention, reliable adaptation, is also assured by means of a spring-element.

According to a further practical embodiment, the base surface, associated with the pressure-element, of the sliding wedge is flat. This permits inexpensive production of the sliding wedge. Furthermore, it provides a suitable support-surface for the spring-element and/or for an additional element provided between the said spring-element and the sliding wedge. The said support-surfaces lies substantially perpendicular to a radial plane and accurate, radial spring-loading is thus assured. Moreover, the said base surface preferably runs parallel with the axis of rotation.

In one practical embodiment of the invention, a space is provided, in the position of rest, between part of the base surface of the sliding wedge and the surface of the pressure-element associated therewith. When the load is applied, the said space decreases, allowing the said surfaces to bear upon each other, if necessary. A specific stop is thereby provided, thus reliably preventing overloading of the spring-elements. The coupling is thus torsionally rigid.

In one particularly practical construction, a piston, acted upon by a pressure-medium, is arranged in the pressure-element chamber and at least one choke-location, to a further chamber for the pressure-medium, is provided. This provides, at a comparatively low cost, reliable damping by means of the pressure-medium, which may be a hydraulic oil or the like. Loading-impacts between the halves of the coupling are thus reliably damped. If the pressure-element comprises at least two chambers, these may communicate with each other through one or more choke-locations. For example, if, as a result of torque, one piston is forced radially inwardly and another piston is forced radially outwardly, the pressure-medium passes from one chamber, through the choke-location, to the other chamber. The degree of damping may be specifically predetermined by calculation. Thus particular requirements may be taken into account by varying the configuration of the chambers in particular, of the choke-locations, and of the total flow-path of the pressure-medium.

In one further embodiment, the chamber associated with the sliding wedge is in communication with an equalizing chamber in the pressure-element. Arranged in the said equalizing chamber is a piston acted upon by a spring-element. It is desirable for all of the chambers associated with the sliding elements to be in communication with the same equalizing chamber. The spring element of the equalizing chamber may be provided additionally to, or alternatively to the first-mentioned chambers. If, in a preferred embodiment, a spring-element is provided only in the equalizing chamber, additional spring-elements in the remaining chambers may be dispensed with, and this provides not inconsiderable simplification of production and assembly. For example, the pressure-medium need be introduced into the chambers only after complete assembly of the shaft-coupling, and there can be no prior preloading of sliding wedges and coupling-halves.

In yet another embodiment, the radially internal pressure-element comprises a central axial bore which is in communication with the chambers through radial passages, more particularly radial choke-locations. This permits particularly simple production of the pressure-element and of the connection provided between the chambers. The equalizing chamber is also preferably in the form of an axial passage, but may, with advantage, be larger in diameter. It is also desirable for the equalizing chamber to be arranged in a radial plane different from that of the first-mentioned chambers, thus ensuring optimal utilization of the pressure-element. This makes it possible for the dimensions of the equalizing chamber to be independent of those of the other chambers and of the relevant requirements.

In still another embodiment, the central axial passage and/or the equalizing chamber is closed off by means of a cover. The axial passage may be in the form of a blind hole or a through-hole.

Accordingly, the invention as broadly claimed lies in a shaft-coupling formed of two halves each having at least two flat sloping surfaces running at right angles to a load-transfer direction; a sloping surface of one of said halves facing a sloping surface of the other half to form a pair; each such pair of facing flat sloping surfaces defining a gap therebetween in which a wedge is slidably mounted; each wedge having two flat sliding surfaces facing away from each other; said sliding surfaces of said wedges facing the sloping surfaces of said gaps in which said wedges are slidably mounted; and a pressure-element, mounted inside said shaft-coupling-forming halves, upon which pressure element said sliding wedges are supported, the improvement therein which comprises: spring-elements for radial spring-action on said sliding wedges, each spring-element being mounted between one of said sliding wedges and said pressure-element.

A description now follows of embodiments of the invention made in conjunction with the appended drawings, wherein.

Figure 1:
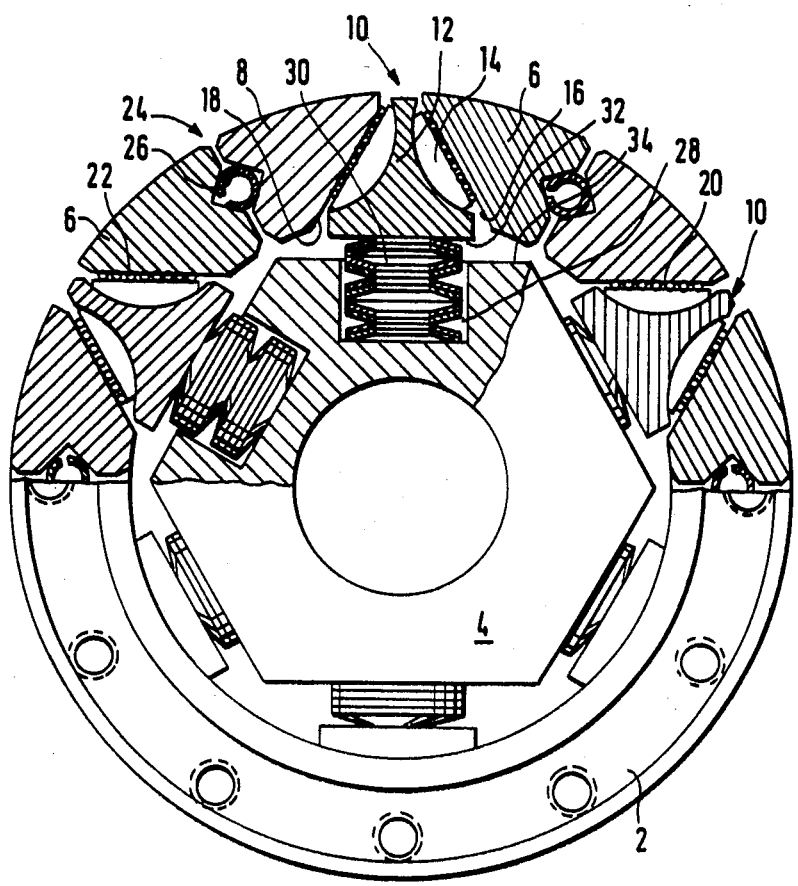
FIG. 1 is an axial view, partly in cross-section, of a shaft-coupling, the central pressure-element of which comprises chambers for spring-elements.

The lower half of FIG. 1 shows an annular coupling-half 2 surrounding a central pressure-element 4. Visible in the upper half of FIG. 1 are coupling dogs 6 and 8, dogs 6 pertaining to coupling-half 2 and dogs 8 to another coupling-half. Located in gaps 10 between coupling dogs 6, 8 are sliding wedges 12 containing equalizing elements 14. Sloping surfaces 16, 18 are associated with dogs 6, 8 and sliding surfaces 20 with equalizing elements 14. In order to avoid substantial radial restoring forces, an alternative preferred embodiment provides needle-bearings 22 between sliding wedges 12, equalizing elements 14 thereof, and coupling dogs 6, 8. Arranged in additional gaps 24 are annular springs 26 which prevent coupling dogs 6, 8 from striking each other heavily if negative torques arise. It is emphasized that it lies within the scope of the invention for the equalizing element or elements to be arranged accordingly upon the coupling-halves.

Central pressure-element 4 is formed with radially directed chambers 28 each associated with a sliding wedge 12. Located in each chamber is a spring-element 30, shown here as a stack of disc-springs. Within the scope of this invention, the said spring-element may also be in the form of a friction-spring consisting of two outer rings upon which a central ring is supported by conical surfaces. With a friction-spring of this kind, the coefficient of friction, and thus also the damping characteristic, may be easily and accurately predetermined. Sliding wedge 12 has a flat base surface 32 facing a similar flat top surface 34 on the rigid pressure-element 4. A part of the base surface 32 of the sliding wedge 12 projects beyond chamber 28, thus ensuring a reliable stop when the spring-element 30 is compressed.

Figure 2:
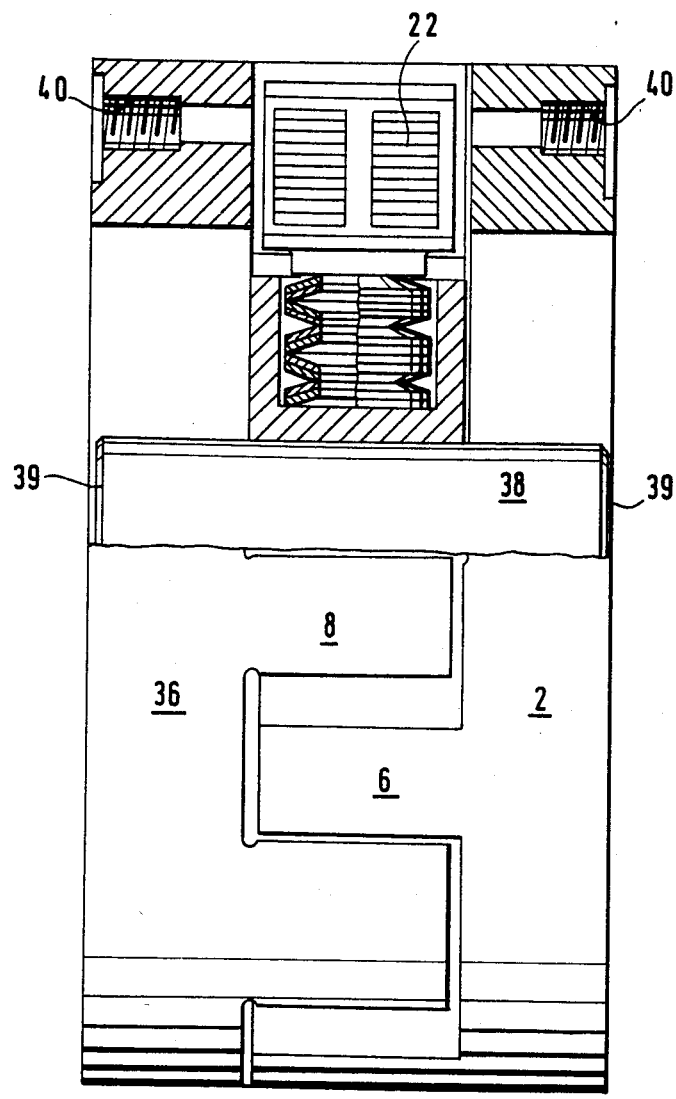
FIG. 2 is an elevation view of the shaft-coupling of FIG. 1 in partial axial cross-section.

FIG. 2 is a view in axial longitudinal section and in side elevation, showing the dog-coupling, in which the second coupling-half 36 is also visible. Pressure-element 4 is in the form of a substantially rigid ring supported upon a shaft 38. Needle-bearing 22 is again visible in the upper part of FIG. 2. It is once more emphasized at this time that a bearing of this kind substantially reduces friction between the sliding wedge and the coupling dogs, thus practically eliminating any restoring forces between coupling-halves 2, 36. The latter comprise threaded holes 40 by means of which a connection to other machine-parts may be established. End-faces 39 of shaft 38 may bear against the shafts to be coupled together, whereby shaft 38 is located axially. The symmetrical support and/or arrangement, according to the invention, of the spring-elements ensures satisfactory centering of pressure-element 4 under all operating conditions.

Figure 3:
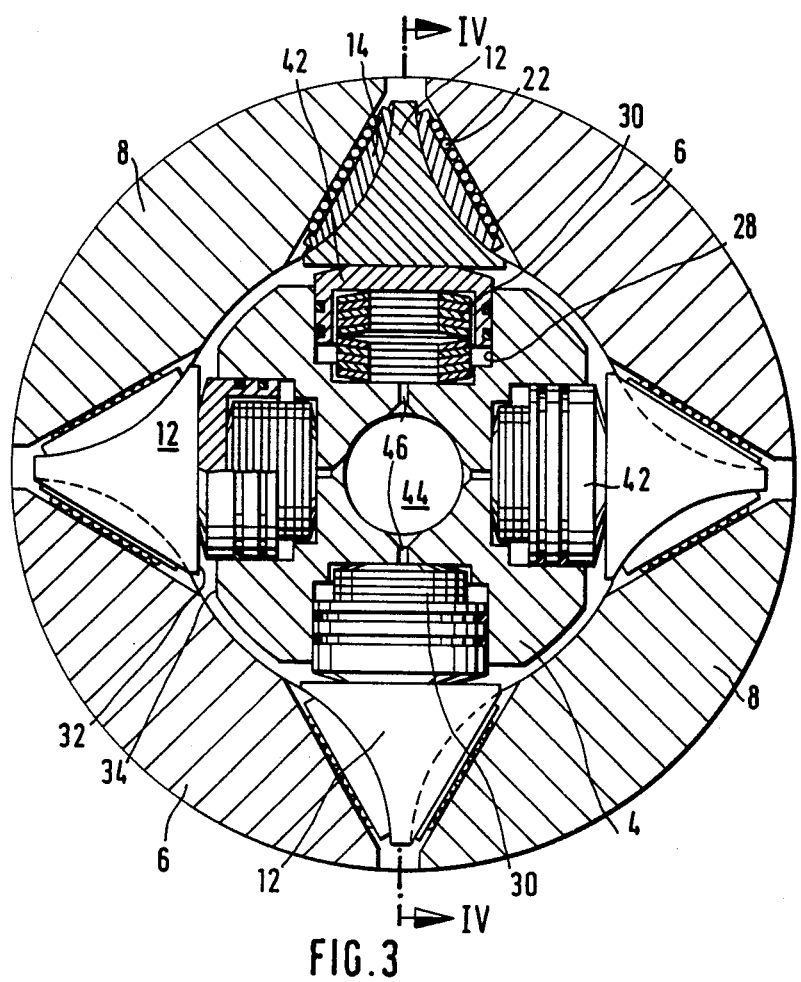
FIG. 3 is a cross-sectional view of a shaft-coupling with hydraulic damping in the unloaded condition.

FIG. 3 illustrates a shaft-coupling in which the central pressure-element 4 comprises four chambers 28 arranged symmetrically in relation to the axis of rotation. Located in each chamber 28 is a piston 42 and a spring-element 30, one end of which bears against the radially inward bottom of the chamber 28, while the other end bears against the inner surface of the piston 42. Pressure-element 4 also contains an axial bore 44 and radial passages 46 connecting said bore 44 with the four radial chambers 28. Flat, radially inward, base surfaces 32 of sliding wedges 12 bear against pistons 42. Equalizing elements 14 of sliding wedges 12 are also clearly visible, as are needle-bearings 22 between equalizing elements 14 and coupling dogs 6, 8 for the purpose of preventing restoring forces.

Chambers 28 and axial bore 44 are filled with a pressure-medium, more particularly hydraulic oil, while radial passages 46 constitute choke-passages for the said pressure-medium. It will be seen that, when a load is applied to the coupling, the resulting radial movements of sliding wedges 12 cause the pressure-medium to flow accordingly through radial passages, or choke-passages, 46, which effectively dampen the said movements. The damping effect may be specifically predetermined by using choke-passages 46 of suitable dimensions. The fact that environmental factors, more particularly temperature-fluctuations or wear, have a comparatively minor effect, and that the damping behaviour of the shaft-coupling can be accurately calculated and predetermined for all applications, is of decisive importance.

Figure 4:
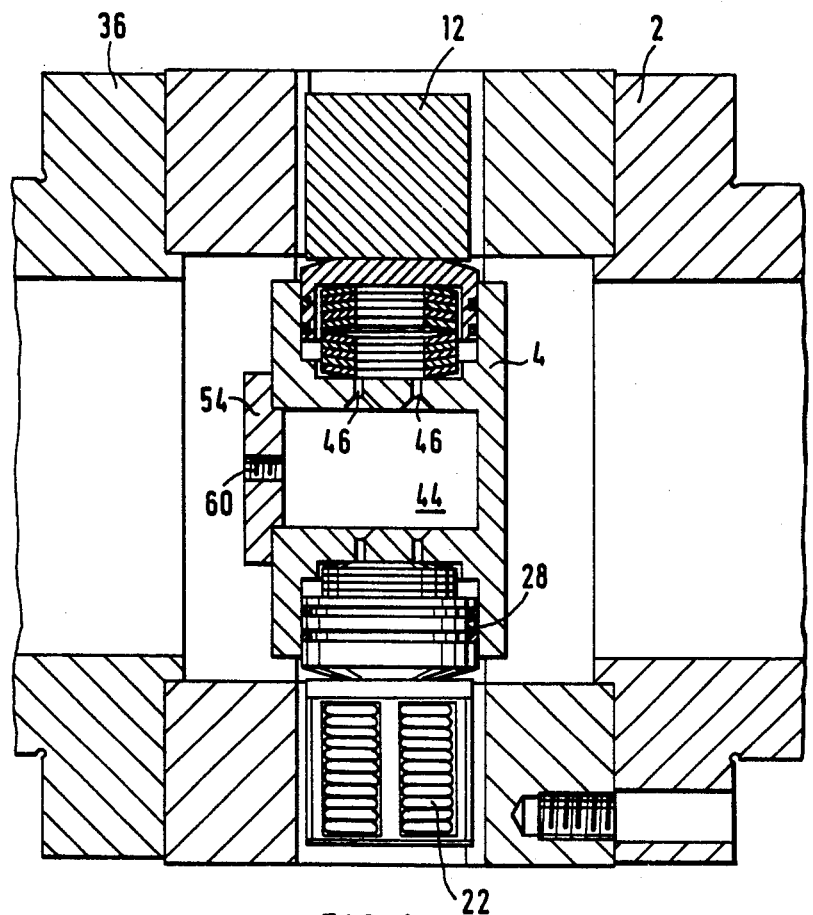
FIG. 4 is a cross-section along line IV—IV in FIG. 3.

The cross-section according to FIG. 4 shows pressure-element 4 comprising a central axial bore 44, in this case a blind bore closed off by means of a cover 54. The pressure-medium may easily be introduced into chamber 44 through an aperture 60 in cover 54 which is then closed off by means of a screw or the like. Axial bore 44 is in communication with each radial chamber 28 through two radial passages 46. It will be seen that the damping behaviour may be predetermined, in the manner desired, also by the number of radial passages 46.

Figure 5:
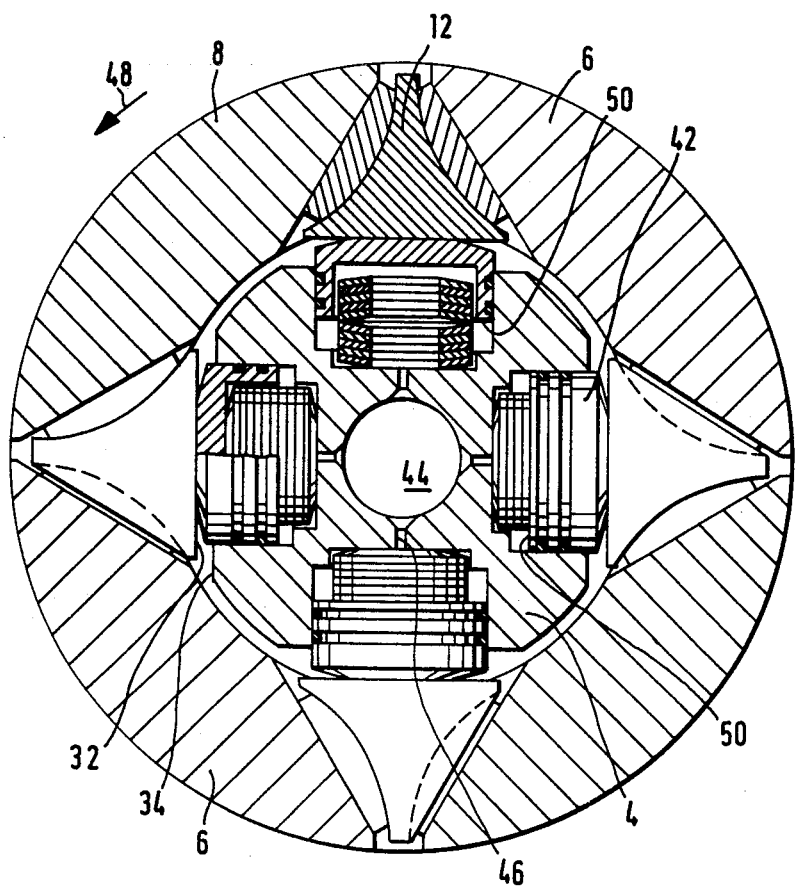
FIG. 5 is a view of the shaft-coupling according to FIG. 3 in the loaded condition.

FIG. 5 illustrates a modified form in which sliding wedges 12 and dogs 6, 8 bear against each other through sliding bearings. One of the coupling-halves, and thus dogs 8, has a torque applied to it in the direction of arrow 48, in relation to the other coupling-half and dogs 6. The result of this is that sliding wedge 12, shown to the left in the drawing, and also the sliding wedge shown to the right, are forced radially inwardly. In contrast to this, sliding wedges 12, shown at the top and bottom of the drawing are moved radially outwardly. At this time, part of the pressure medium from lateral chambers 28 is forced through radial passages 46, axial bore 44, and finally upper and lower passages 46, into relevant chambers 28. This produces damping of the movements outlined, The degree of damping is specifically predetermined by the dimensions of the system acted upon by the pressure-medium and, in particular by the choke-passages.

Sliding wedges 12, shown laterally in the drawing, are forced inwardly by the radial load, thus reducing the distance between flat surface 32 and flat surface 34 of pressure-element 4. As the load increases, surfaces 32 and 34 come into contact, thus protecting the spring-elements and the hydraulic system from excessive loading. Inner end-face 50 of piston 42 may also be brought into engagement with an associated surface of pressure-element 4, also for the purpose of establishing a stop. According to this embodiment, this limits the resilient range of the coupling. With any further increase in the load, the shaft-coupling becomes torsion-proof.

Figure 6:
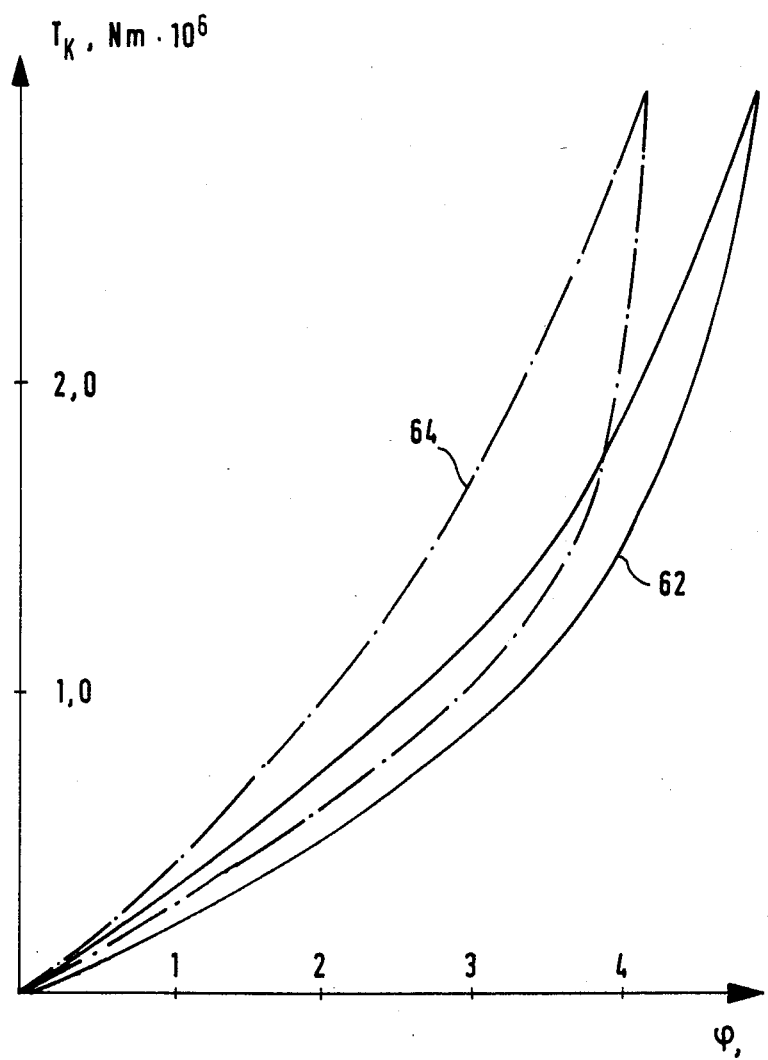
FIG. 6 are characteristic curves of two embodiments of shaft-couplings.

FIG. 6 shows two characteristic curves for two shaft-couplings of different construction. Full line 62 applies to a coupling, the sliding wedges of which are supported by roller-elements, more particularly needle-bearings, upon the sloping surfaces of the relevant coupling dogs. In contrast to this, dotted line 64 applies to a coupling, the sliding wedges of which are treated with a suitable lubricant, or are supported upon the sloping surfaces of the relevant coupling dogs by a DU lining. It may be gathered directly from these curves that the shaft-coupling according to the invention provides large torsion-angles and great flexibility even in the case of very high torques, or in the case of torques T in excess of 1 million newton-meters and, in spite of this, the structural volume is very small. It will also be seen that the characteristic curves may be predetermined in the manner desired by adjusting the coefficient of friction between the sliding wedge and the coupling dogs.

Figure 7:
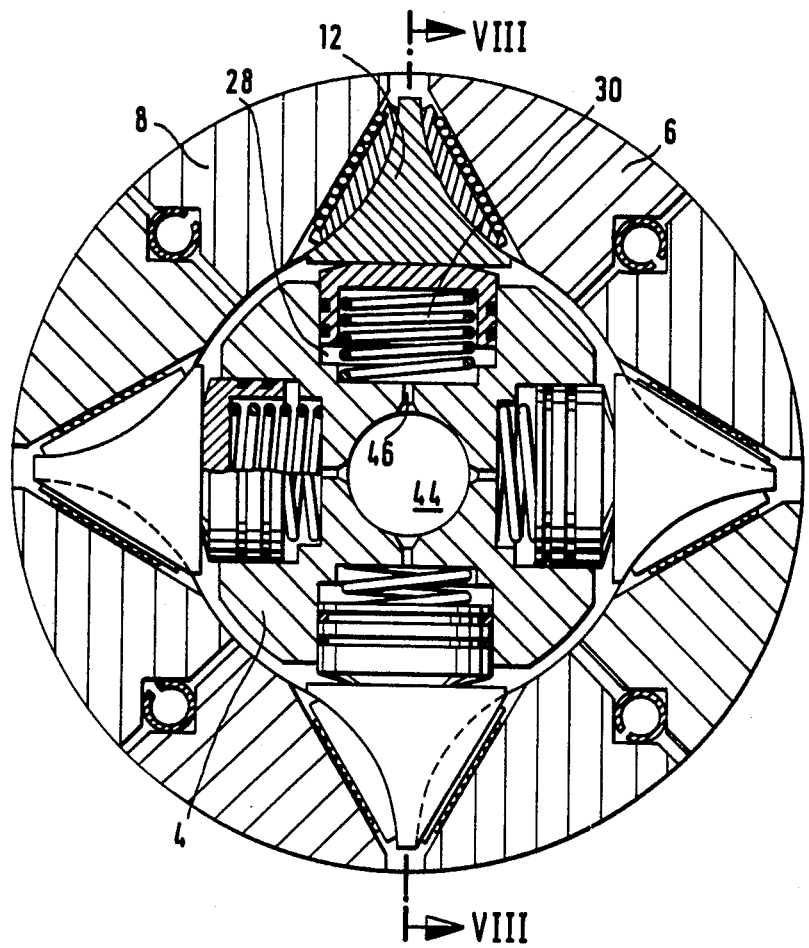
FIG. 7 is a cross-section view at right angles to the longitudinal axis of a shaft-coupling similar to that in FIG. 1.

FIG. 7 illustrates an embodiment which is basically comparable with the coupling according to FIG. 1, but wherein the axial bore 44 is in communication, through radial passages 46, with the four radial chambers 28 for four symmetrically arranged sliding wedges. In this construction, sliding wedges 12 are urged radially inwardly against the force of spring-elements 30.

Figure 8:
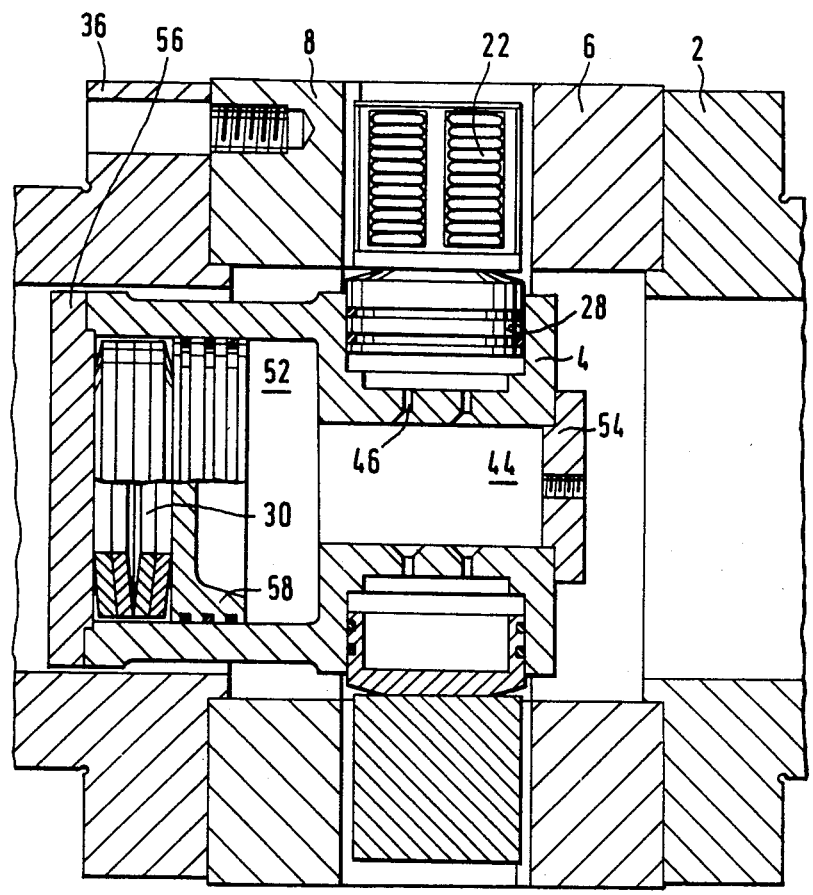
FIG. 8 is a partial axial longitudinal cross-section through a shaft-coupling having a central equalizing chamber.

It may be gathered from FIG. 8 that the central pressure-element comprises an equalizing chamber 52 which directly adjoins axial bore 44 and is also filled with the pressure-medium, more particularly hydraulic oil. The said equalizing chamber is closed off with a cover 56 and a spring-element is provided between the said cover and a piston 58. According to this embodiment, a single spring-element suffices, and the above-mentioned spring-elements 30 in radial chambers 28 may be omitted. The radial spring-action upon sliding wedges 12 is applied, through the intervening pressure-medium, by the said spring-element 30 in equalizing chamber 52. However, constructions in which spring-elements 30 are arranged both in equalizing chamber 52 and in radial chambers 28 lie within the scope of this invention. When a load is applied to the shaft-coupling illustrated, all of the sliding wedges move radially inwardly, as already explained. Equalizing chamber 52, with spring-loaded piston 58, allows the pressure-medium to flow out of chambers 28, through radial passages 46, into the said equalizing chamber, in order to obtain damping.

I claim:

1. In a shaft-coupling formed of two halves each having at least two flat sloping surfaces running at right angles to a load-transfer direction; a sloping surface of one of said halves facing a sloping surface of the other half to form a pair; each such pair of facing flat sloping surfaces defining a gap therebetween in which a wedge is slidably mounted; each wedge having two flat sliding surfaces facing away from each other; said sliding surfaces of said wedges facing the sloping surfaces of said gaps in which said wedges are slidably mounted; and a pressure-element, mounted inside said shaft-coupling-forming halves radially inwardly of said wedges, upon which pressure elements said sliding wedges are supported, the improvement therein which comprises: spring-elements for radial spring-action on said sliding wedges, each spring-element being mounted between one of said sliding wedges and said pressure-element and said pressure-element being formed with radial chambers, each spring-element being received in one of said radial chambers.

2. A shaft-coupling according to claim 1, wherein each of said wedges has a flat base surface and said pressure element has flat top surfaces, the base surface of each wedges facing one of said top surfaces and being parallel thereto as well as perpendicular to a radial plane of said pressure element.

3. A shaft-coupling according to claim 2, wherein said radial chambers are outwardly open radial bores at the periphery of said pressure element.

4. A shaft-coupling according to claim 3, wherein said pressure element is formed with an axial pressure fluid-containing central bore in communication with said radial chambers through choke-passages and said spring elements each has a piston in contact with said base of the sliding wedge operatively corresponding thereto.

5. A shaft-coupling according to claim 3, further comprising: means defining an equalizing chamber in said pressure element in communication with said pressure fluid-containing bore whereby to communicate with said radial chambers through said choke-passages, and a spring element in said equalizing chamber.

6. A shaft-coupling formed of two halves each having at least two flat sloping surfaces running at right angles to a load-transfer direction; a sloping surface of one of said halves facing a sloping surface of the other half to form a pair; each such pair of facing flat sloping surfaces defining a gap therebetween in which a wedge is slidably mounted; each wedge having two flat sliding surfaces facing away from each other; said sliding surfaces of the wedge facing the sloping surfaces of the gap in which the wedge is slidably mounted; and a pressure-element mounted inside said shaft-coupling-forming halves radially inwardly of said wedges, said pressure element being formed with a radial chamber for each wedge, a piston in each such radial chamber with said sliding wedge being supported on said piston, said pressure element further being formed with a central chamber in fluid communication with each radial chamber, a piston in said central chamber, a pressure medium in said central and radial chambers, and a spring in said central chamber for exerting a spring-action on said piston in said central chamber, said spring action being transmitted to each sliding wedge via the pressure medium and the piston in each radial chamber.

7. A shaft-coupling according to claim 6, wherein said central chamber communicates with each radial chamber through at least one radial choke-passage which is always open.

8. A shaft-coupling according to claim 6, wherein said central chamber opens through an axial end face of said pressure element and is tightly closed with a cover, said spring being disposed between said cover and said piston in said central chamber.

* * * * *